Nov. 3, 1925.

J. GAIR ET AL 1,560,156

VEHICLE WHEEL

Filed June 16, 1923

Inventors
James Gair,
W. S. Williams and
Edwin Jones
by Barthel & Barthel
attys

Patented Nov. 3, 1925.

1,560,156

UNITED STATES PATENT OFFICE.

JAMES GAIR AND WATKIN SALUSBURY WILLIAMS, OF LONDON, AND EDWIN JONES, OF LIVERPOOL, ENGLAND.

VEHICLE WHEEL.

Application filed June 16, 1923. Serial No. 645,888.

*To all whom it may concern:*

Be it known that we, JAMES GAIR, of 165 Lynton Road, Acton Hill, London W., England, WATKIN SALUSBURY WILLIAMS, of 37 Elsham Road, London W. 14, England, and EDWIN JONES, of 6 Carlton Terrace, Milton Road, Edge Lane, Liverpool, in the county of Lancaster, England, having invented certain new and useful Vehicle Wheels, do hereby declare that the following is a full, clear, and exact description of same.

This invention relates to wheels for vehicles, especially motor vehicles, and has particular reference to that form of tyre construction in which a plurality of air-inflated or pneumatic bags or tubes of greater length in the direction of the circumference of the wheel than breadth are located between a felloe rim and an outer floating tread rim.

Broadly, our invention consists in the provision on said pneumatic bags or tubes, of beads or like projections whereto inturned sides or edges of a tread rim may be secured. Preferably said pneumatic bags or tubes are also provided with beads or like projections for securing to the felloe rim of a wheel in the customary or other convenient manner.

In some cases, as when a tyre is designed for application to a heavy motor vehicle, and the tyre construction includes said pneumatic bags or tubes, in order to ensure the prevention of longitudinal displacement thereof and to provide supplementary "driving" means between the felloe and tread rims, spaced indentations or recesses of appropriate shape or configuration are provided in the bags or tubes in the course of manufacture, which indentations or recesses receive stop members supported from the tread rim or felloe rim.

Said tread rim is preferably composed of a steel ring with inturned sides or edges and an india rubber tread secured thereto, and the felloe rim—especially when the invention is applied to heavy motor vehicles— may be of detachable type.

We will further describe our invention with the aid of the accompanying sheets of explanatory drawings, which illustrate, by way of example only, one mode of embodying same, there being selected for illustration a tyre construction which includes said pneumatic bags or tubes.

In said drawings:—

Figure 2:
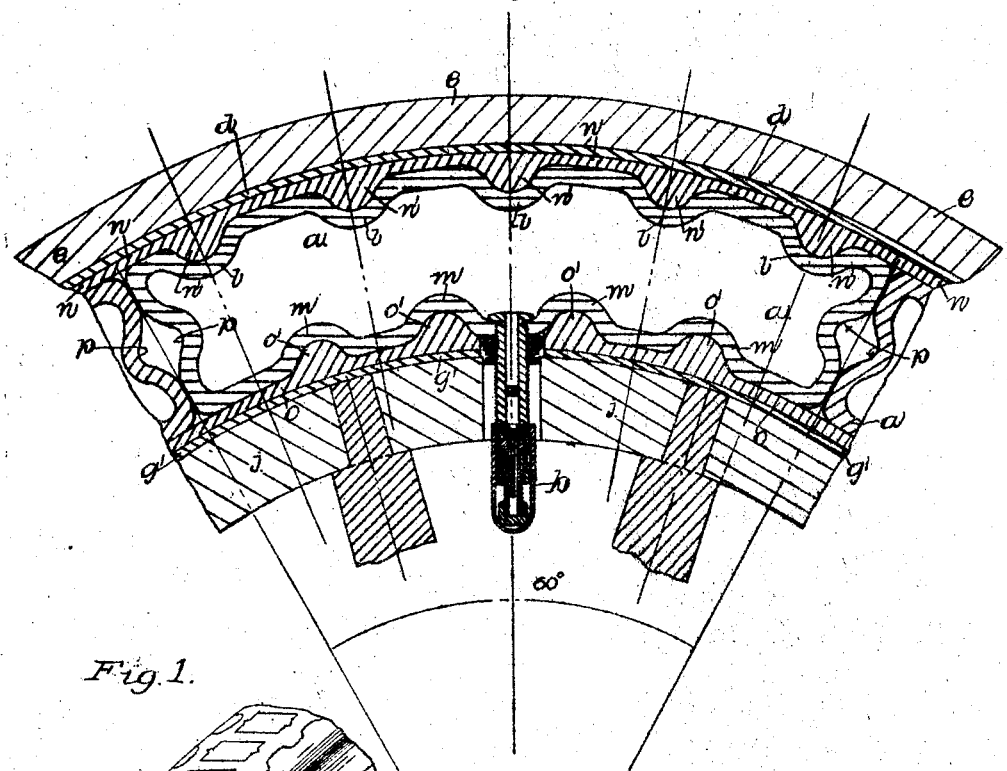
Figure 1:
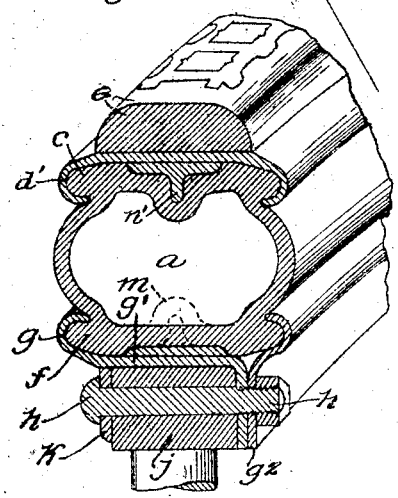

Fig. 1 is a transverse section, and,

Fig. 2 a longitudinal section, of a portion of a wheel and tyre.

Figure 3:
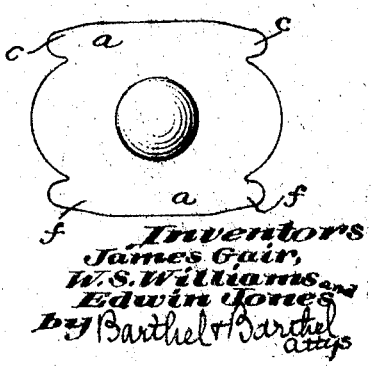

Fig. 3 is an end elevation of a bag or tube.

$a, a$, generally designate pneumatic bags or tubes constructed of india rubber with canvas reinforcement, and which are adapted to be inflated as and when required by means of valves as $b$. $c, c$ are lateral beads formed on the outer portion of a bag or tube, which beads are adapted to enter the inturned sides or edges $d^1$ of a steel tread rim $d$, whereto a tread $e$ of india rubber is vulcanized.

There are also formed on the pneumatic bags or tubes lateral beads or projections $f, f$, which are embraced by the inturned sides or edges $g$ of the components $g^1, g^2$, forming the felloe rim, said rim components being detachably secured together by means of spaced bolts $h$ extending through said rim components $g^1, g^2$, the felloe $j$ and washer plates $k$.

In said pneumatic bags or tubes there are formed spaced indentations or recesses $l$ and $m$, respectively, and which are arranged relatively out of radial alignment, as shown. Suitably secured to said tread rim $d$, is a steel ring $n$ on which are formed projections $n^1$ adapted to enter the bag recesses $l$ and suitably secured to the felloe rim component $g^1$ is a steel ring $o$ on which are formed projections $o^1$, adapted to enter the bag recesses $m$.

Said projections $n^1, o^1$, by engagement with the bags or tubes ensure the prevention of longitudinal displacement of the bags or tubes, and also constitute driving elements: further the rings $n, o$ tend to strengthen the tread and felloe rims respectively.

Said rings $n$, and $o$, may be constructed of suitable material other than steel; for instance, these may be of vulcanite, vulcanized fibre, or the like.

In the end walls of said pneumatic bags or tubes there are formed indentations or recesses $p$ which ensure that said end walls shall "give" or yield inwards under road shocks and vibrations.

It is to be noted that the connection of the tread rim with the felloe rim is effected solely through said pneumatic bags or tubes.

What we claim as our invention and desire to secure by Letters-Patent is:—

1. A vehicle wheel including a felloe rim having clencher edges, a tread rim having clencher edges, and tire sections, each having two sets of beads, one set for engagement with the clencher edges of the felloe rim and the other set for engagement with the clencher edges of the tread rim, said tire sections being disposed end to end and constituting a single circumferential means of connecting said felloe rim and tread rim.

2. A vehicle wheel as called for in claim 1, and rings on the confronting walls of said felloe rim and tread rim and engaging in depressed portions of said tire sections.

In testimony whereof I the said EDWIN JONES affix my signature.

EDWIN JONES.

In testimony whereof we JAMES GAIR and WATKIN SALUSBURY WILLIAMS affix our signatures.

JAMES GAIR.
WATKIN SALUSBURY WILLIAMS.